US005561728A

United States Patent [19]
Kobayashi et al.

[11] Patent Number: 5,561,728
[45] Date of Patent: Oct. 1, 1996

[54] OPTICAL FIBER SPLICER

[75] Inventors: Mikio Kobayashi; Takeo Seike; Atsuhiro Ona, all of Yokohama; Shikou Kodama, Kobe, all of Japan

[73] Assignee: Sumitomo Electric Industries, Ltd., Japan

[21] Appl. No.: 516,437

[22] Filed: Aug. 17, 1995

[30] Foreign Application Priority Data

Aug. 18, 1994 [JP] Japan .................. 6-218219

[51] Int. Cl.⁶ .................................................. G02B 6/36
[52] U.S. Cl. ............................................................ 385/97
[58] Field of Search .................................... 385/95–99

[56] References Cited

U.S. PATENT DOCUMENTS

| | | | |
|---|---|---|---|
| 3,407,018 | 10/1968 | Miller | 385/896 |
| 4,426,055 | 1/1984 | Reedy | 248/184 |
| 4,825,092 | 4/1989 | Mehadji | 250/561 |
| 4,914,797 | 4/1990 | Tsuchida | 29/281.1 |
| 5,168,617 | 12/1992 | Tsuchida | 29/281.1 |
| 5,218,184 | 6/1993 | Hakoun et al. | 385/97 |

FOREIGN PATENT DOCUMENTS

| | | | |
|---|---|---|---|
| 59-111120 | 6/1984 | Japan | 385/97 |
| 60-207104 | 10/1985 | Japan | 385/97 |
| 3-77901 | 8/1995 | Japan . | |

*Primary Examiner*—John Ngo
*Attorney, Agent, or Firm*—Cushman Darby & Cushman, LLP

[57] ABSTRACT

This invention relates to micro-driving members for performing alignment of optical fibers and the like. Backlash is eliminated by forming constituent elements as integral components, thereby improving driving precision. Each micro-driving member includes a base portion in which an insertion hole for an urging means is formed, a support portion integral with the base portion and opposing the insertion hole, an urged portion urged by the urging means, and a table portion for supporting a driving target. The table portion has one side connected to a first horizontal flexible portion extending from the support portion, and the other side which is open.

7 Claims, 13 Drawing Sheets

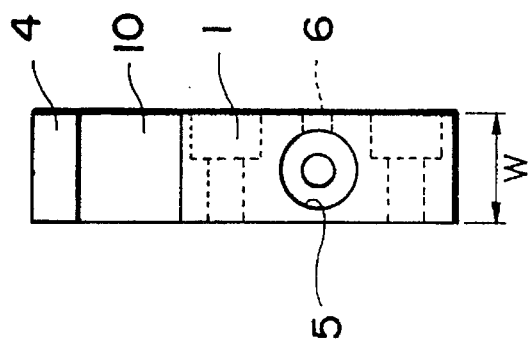
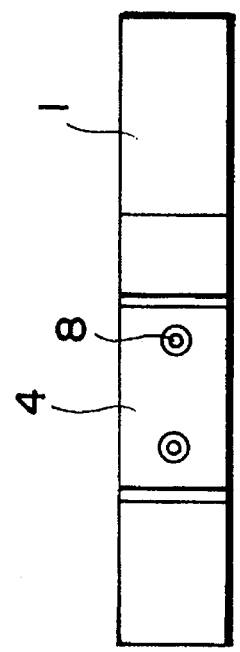
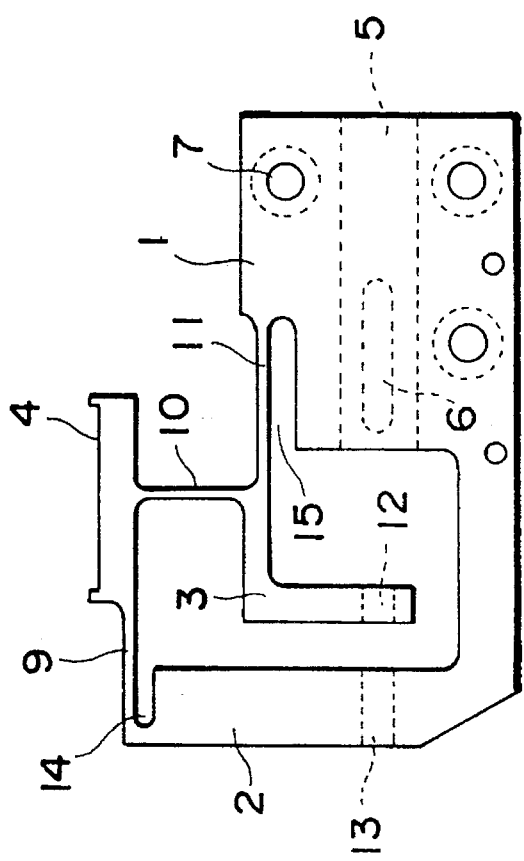

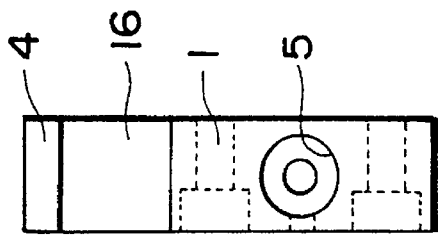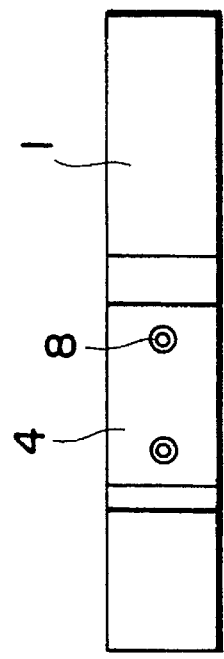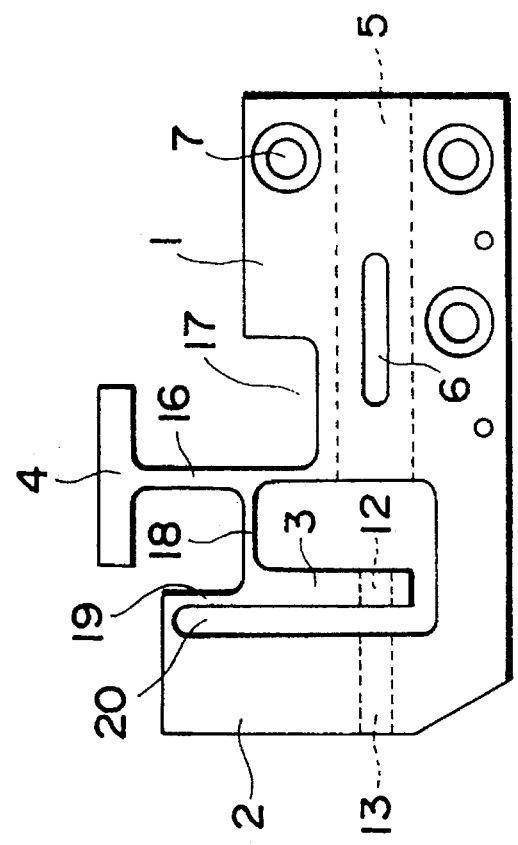

OPTICAL FIBER SPLICER

BACKGROUND OF THE INVENTION

1. Field of the Invention

The present invention relates to micro-driving members used for, e.g., alignment in fusion-splicing optical fibers, and an optical fiber fusion-splicer employing them.

2. Related Background Art

FIG. 5 shows the fundamental principle of an aligning mechanism used for fusion-splicing optical fibers. In the aligning mechanism, blocks 60 and 61 each having a V-groove formed in its upper surface are arranged opposite to each other, and the end portions of optical fibers 62 and 63 to be connected are placed in the respective V-grooves, thereby aligning the optical fibers. Alignment is performed by moving the block 60 on the right side in FIG. 5 vertically and the block 61 on the left side in FIG. 5 horizontally. This movement requires very high precision, and is performed by utilizing distortion in beams 65 which occurs when depressing the beams 65 cantilevered by corresponding support tables 64 with microcylinders 66 through coil springs 67.

SUMMARY OF THE INVENTION

In FIG. 5, the arrangement of the beams 65 is simply shown to explain the principle of the micro-driving mechanism. In an actual apparatus, however, a plurality of components are employed in the mechanism including the support tables 64, the beams 65, and the blocks 60 and 61. Thus, small backlash among the respective constituent components leads to a decrease in aligning precision. Due to this backlash, adjustment of the apparatus requires a cumbersome, time-consuming operation.

A splicer according to the present invention employs two deformable members biased in the same direction. These members have portions that are moved in different directions by this biasing operation.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2A is a plan view of a first deformable member;

FIG. 2B is a side view of the first deformable member;

FIG. 2C is a front view of the first deformable member;

FIG. 3A is a plan view of a second deformable member;

FIG. 3B is a side view of the second deformable member;

FIG. 3C is a front view of the second deformable member;

DESCRIPTION OF THE PREFERRED EMBODIMENT

The present invention will be described by way of an optical fiber aligning mechanism.

Figure 1:
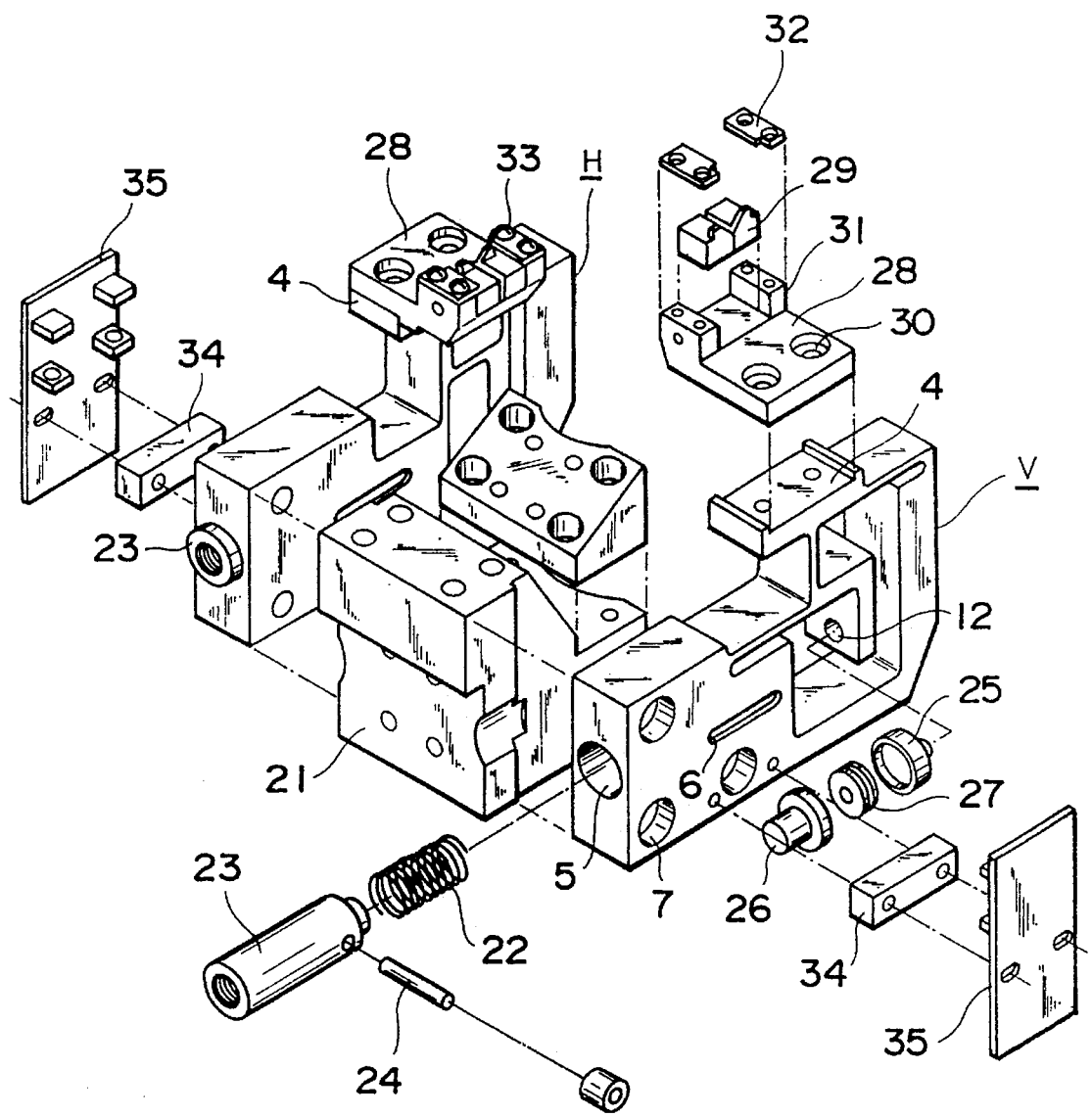
FIG. 1 shows part of a driving mechanism.

FIG. 1 is a view for explaining assembly of the mechanism of the present invention. As shown in FIG. 1, a driving member for vertical movement and a driving member for horizontal movement are fixed on the two sides of a base body.

Driving Member for Vertical Movement

As shown in FIGS. 2A to 2C, the driving member for vertical movement (first deformable member) has a base portion 1, a support portion 2, an urged portion 3 to be urged by a microcylinder, and a table portion 4 for supporting a block that holds an optical fiber. All these components are integrally formed without coupling portions.

The base portion 1 has a substantially block-like shape, and an insertion hole 5 in which the microcylinder is to be inserted is formed in the base portion 1. The insertion hole 5 is a round hole formed in substantially the center of the base portion 1 in the elongated direction (widthwise direction), and extends from one to the other end of the base portion 1.

An elongated hole 6 extending in the longitudinal direction is formed in the rear surface of the base portion 1 and reaches the insertion hole 5. The elongated hole 6 is engaged with a guide pin 24 fixed to a cylindrical member 23 of the microcylinder, so that the elongated hole 6 serves as a guide hole when the cylindrical member 23 moves forward/backward.

Bolt holes 7 are formed in three portions of the base portion 1 to extend from the front to rear surface of the base portion 1. The bolt holes 7 threadably engage with bolts employed when mounting this driving member to a driving mechanism (to be described later).

The support portion 2 is an L-shaped portion extending horizontally from the lower portion of the base portion 1 and bent at a right angle to extend upward, so that it opposes the insertion hole 5. The support portion 2 has a larger thickness than those of the urged portion 3, horizontal flexible portions 9 and 11, and a vertical flexible portion 10 (to be described later).

The table portion 4 has a rectangular plate-like body to which a block for holding an optical fiber is mounted. Bolt holes 8 for mounting the block are formed in the upper surface of the table portion 4. One side of the table portion 4 is connected to and held by the support portion 2 through the first horizontal flexible portion 9, and the other side of the table portion 4 is open. The lower surface of the table portion 4 is connected to one end of the urged portion 3 (to be described below) through the vertical flexible portion 10.

The urged portion 3 is an L-shaped small segment having a thickness about half that of the support portion 2. One end of the urged portion 3 is connected to the upper portion of the base portion 1 through the second horizontal flexible portion 11 so that the urged portion 3 is arranged between the base portion 1 and the support portion 2. Accordingly, one end of the urged portion 3 and the second horizontal flexible portion 11 are located on a straight line, and the vertical flexible portion 10 extending from the lower surface of the table portion 4 is connected to almost the boundary between the urged portion 3 and the second horizontal flexible portion 11. The other end of the urged portion 3 is an open end, located at a position to oppose the insertion hole 5, and urged by the microcylinder mounted in the insertion hole 5 of the base portion 1.

A seat member of a spring (to be described later) is mounted to the other end of the urged portion 3. For this purpose, a round hole 12 is formed in the other end of the urged portion 3 to fit on this seat member. This round hole 12 is formed by boring the support portion 2 and further the urged portion 3 with a drill or the like. A hole 13 formed in the support portion 2 at this time becomes a lightening hole.

The horizontal and vertical flexible portions 9 and 10 extending from the table portion 4, and the horizontal flexible portion 11 extending from the urged portion 3 are very thin plate-like bodies which are easily flexed even with a very small stress. The first horizontal flexible portion 9 is connected to the upper end of the support portion 2 to form a thin elongated U-shaped notch 14 together with the support portion 2. The second horizontal flexible portion 11 is connected to the upper end of the base portion 1 to form a thin elongated U-shaped notch 15 together with the base portion 1.

In this driving member, when the other end of the urged portion 3 is urged to the left in FIG. 2B, the second horizontal flexible portion 11 is flexed, and the urged portion 3 is pivoted clockwise about a portion where the second horizontal flexible portion 11 and the base portion 1 are connected to each other as the fulcrum. Therefore, the table portion 4 supported by the vertical flexible portion 10 extending upward from one end of the urged portion 3 also tends to pivot clockwise. As the left side of the table portion 4 is connected to the support portion 2 through the first horizontal flexible portion 9, the table portion 4 trying to pivot clockwise is returned to the left side. As a result, the table portion 4 is moved upward.

In this example, members having sizes to be described later were fabricated from a material to be described later. The obtained driving member was able to move a driving target upward and downward with 1 μm-pitch precision within a range of 140 μm.

The micro-driving member described above may be fabricated by punching, e.g., a stainless steel plate, into a predetermined shape by wire electrical discharge machining.

Driving Member for Horizontal Movement

The driving member for horizontal movement (second deformable member) also has a base portion 1, a support portion 2, an urged portion 3, and a table portion 4 in the same manner as the driving member for vertical movement. However, the shape of the urged portion 3 and how to support the table portion 4 are different in the second deformable member.

As shown in FIGS. 3A to 3C, the table portion 4 is directly connected to the base portion 1 through a first vertical flexible portion 16. A rectangular notch 17 is defined by the first vertical flexible portion 16 and the upper portion of the base portion 1.

The urged portion 3 is a rectangular plate-like body. One end of the urged portion 3 is connected to the intermediate portion of the first vertical flexible portion 16 through a horizontal flexible portion 18 and also to the support portion 2 through a second vertical flexible portion 19. The second vertical flexible portion 19 extends from the upper end of the support portion 2 slightly horizontally (to the right in FIG. 3B) and is bent to extend downward, thereby forming a thin elongated U-shaped notch 20 together with the support portion 2.

In this driving member, when the other end of the urged portion 3 is urged to the left in FIG. 3B, the table portion 4 tends to pivot counterclockwise about a portion where the first vertical flexible portion 16 and the base portion 1 are connected as the fulcrum. As one end of the urged portion 3 is connected to the support portion 2 through the second vertical flexible portion 19, the urged portion 3 suppresses the pivot movement. As a result, the table portion 4 is moved to the left.

This driving member for the horizontal movement is identical to that for the vertical movement in the following respects.

(1) An insertion hole 5 for a microcylinder is formed in the block-like base portion 1, and an elongated hole 6 reaching the insertion hole 5 is also formed in the base portion 1.

(2) Bolt holes 7 are formed in the base portion 1 to extend from the front to rear surface of the base portion 1.

(3) The support portion 2 extends from the lower portion of the base portion 1 to have an L shape.

(4) Bolt holes 8 are formed in the upper surface of the table portion 4.

(5) A round hole 12 is formed in the other end of the urged portion 3.

(6) Punching performed by wire electrical machining is suitable as the manufacturing method.

In this example, members having sizes to be described later were fabricated from a material to be described later. The obtained driving member was able to move a driving target horizontally with 1 μm-pitch precision within a range of 140 μm.

Figure 10:
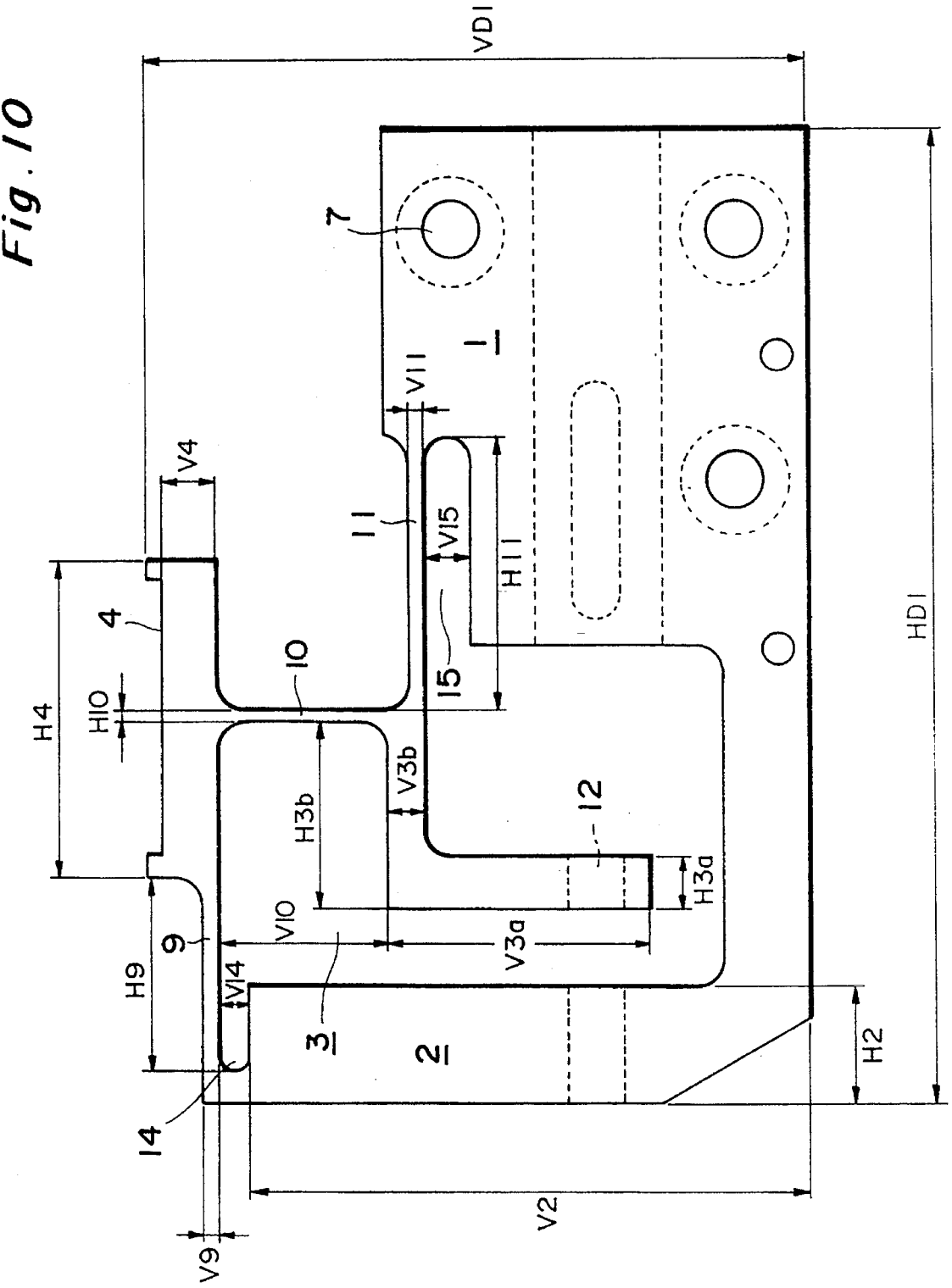
FIG. 10 is a diagram for explaining the scale of the first deformable member.
Figure 11:
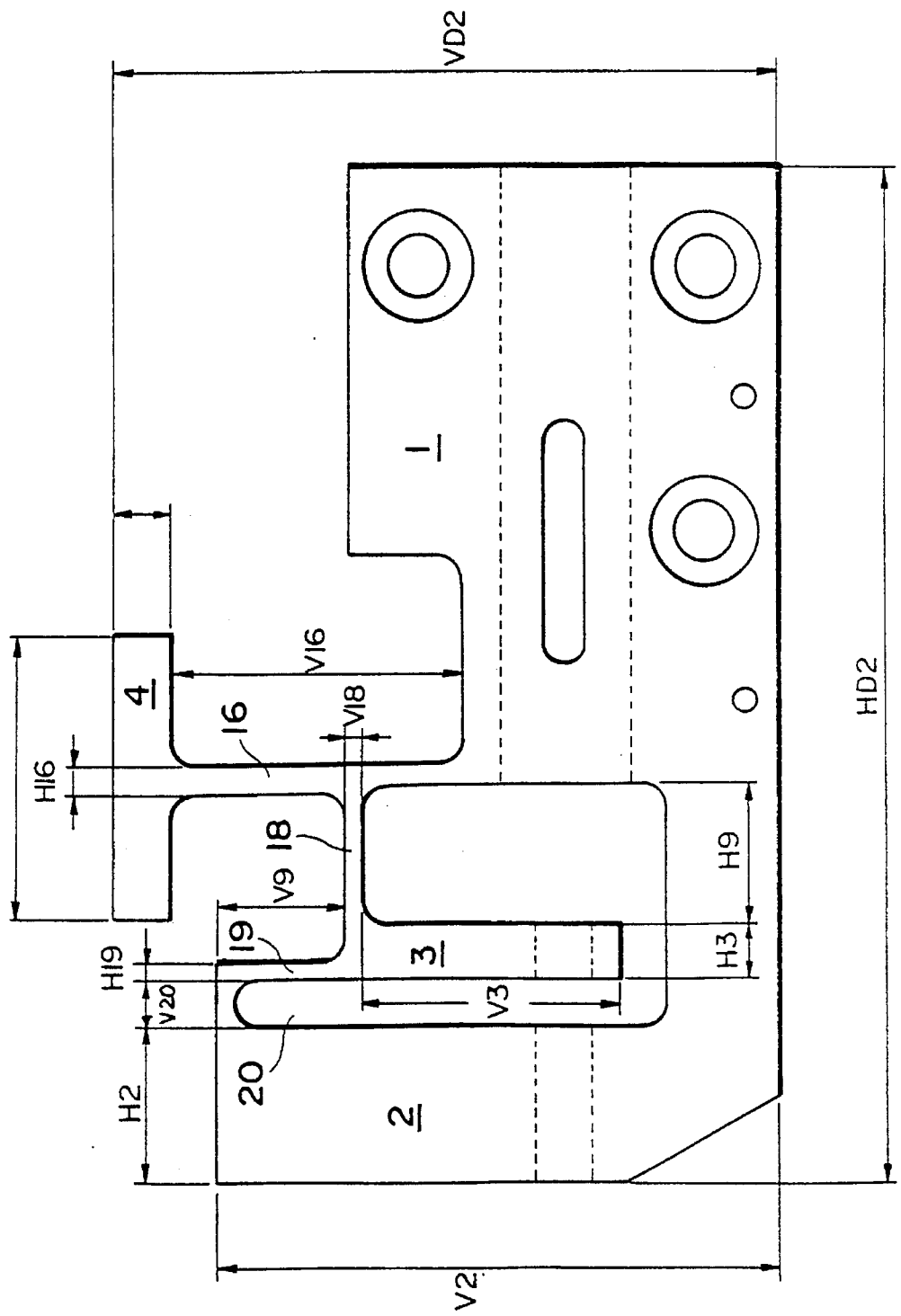
FIG. 11 is a diagram for explaining the scale of the second deformable member.

The sizes of the respective elements are as shown in FIG. 10 and the following table. The respective elements shown in FIG. 2C have the same width W. In this embodiment, W is 12 mm. It is preferable that W is equal to or more than 11.9 mm and equal to or less than 12.1 mm. The figures in each parenthesis indicate a preferable range.

| Vertical driving member D1: | |
| --- | --- |
| material | stainless steel |
| length HD1 | 70 mm (70.1 mm–69.9 mm) |
| height VD1 | 47 mm (47.1 mm–46.9 mm) |
| Vertical flexible portion 10: | |
| thickness H10 | 1 mm (1.0 mm–0.9 mm) |

-continued

| | |
|---|---|
| length V10 | 12 mm (12.1 mm–11.9 mm) |
| First horizontal flexible portion 9: | |
| thickness V9 | 1 mm (1.0 mm–0.9 mm) |
| length H9 | 14.5 mm (14.6 mm–14.5 mm) |
| Second horizontal flexible portion 11: | |
| thickness V11 | 1 mm (1.1 mm–0.9 mm) |
| length H11 | 19.5 mm (19.6 mm–19.5 mm) |
| Support portion 2: | |
| thickness H2 | 8 mm (8.1 mm–7.9 mm) |
| height V2 | 40 mm (40.1 mm–39.9 mm) |
| Table portion 4: | |
| thickness V4 | 4 mm (4.1 mm–3.9 mm) |
| length H4 | 23 mm (23.1 mm–22.9 mm) |
| Urged portion 3: | |
| length V3a | 19 mm (19.1 mm–18.9 mm) |
| thickness H3a | 4 mm (4.1 mm–3.9 mm) |
| length H3b | 13.5 mm (13.5 mm–13.4 mm) |
| thickness V3b | 3 mm (3.1 mm–2.9 mm) |
| gap V14 | 2 mm (2.05 mm–1.95 mm) |
| gap V15 | 3 mm (3.05 mm–2.95 mm) |
| Horizontal driving member D2: | |
| material | stainless steel |
| length HD2 | 70 mm (70.1 mm–69.9 mm) |
| height VD2 | 46 mm (46.1 mm–45.9 mm) |
| First vertical flexible portion 16: | |
| thickness H16 | 2 mm (2.05 mm–1.95 mm) |
| length V16 | 20 mm (20.1 mm–19.5 mm) |
| Horizontal flexible portion 18: | |
| thickness V18 | 1 mm (1.05 mm–0.95 mm) |
| length H9 | 9.5 mm (9.6 mm–9.4 mm) |
| Second vertical flexible portion 19: | |
| thickness H19 | 1.5 mm (1.55 mm–1.45 mm) |
| length V19 | 9 mm (9.1 mm–8.9 mm) |
| Support portion 2: | |
| thickness H2 | 11 mm (11.1 mm–10.9 mm) |
| height V2 | 39 mm (39.1 mm–38.9 mm) |
| Table portion 4: | |
| thickness V4 | 4 mm (4.05 mm–3.95 mm) |
| length H4 | 20 mm (20.1 mm–19.9 mm) |
| Urged portion 3: | |
| length V3 | 18 mm (18.1 mm–17.9 mm) |
| thickness H3 | 4 mm (4.1 mm–3.9 mm) |
| gap V20 | 3 mm (3.05 mm–2.95 mm) |

The operations of these members will be described with reference to FIGS. 6, 12, and 13.

When a motor 36 is driven, a corresponding screw or rotating shaft 37 is rotated. When the screw 37 is rotated, the corresponding cylindrical member 23 biases a corresponding head (contact member) or seat member 25 through a spring 22. The head 25 abuts against the round hole 12.

Figure 12:
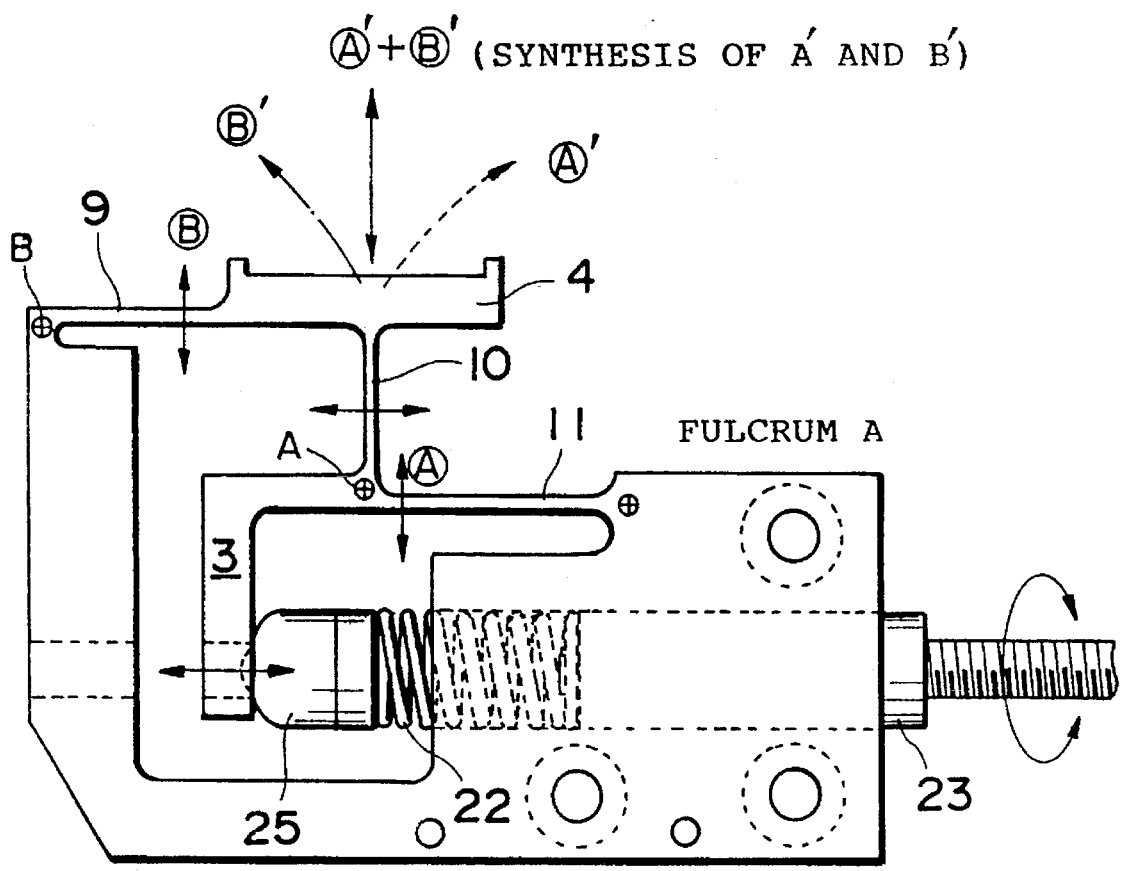
FIG. 12 is a diagram for explaining the operation of the first deformable member.

Referring to FIG. 12, when the urged portion 3 is urged, a vertical driving member D1 is moved to rotate about a fulcrum A as the center. The horizontal flexible portion 11 is flexed downward, and the table portion 4 tends to move as indicated by a broken arrow A' in FIG. 12. At this time, the vertical flexible portion 10 is flexed to the left. Accordingly, the horizontal flexible portion 9 is also flexed downward, and the table portion 4 tends to move as indicated by a broken arrow B' about a fulcrum B as the center. Therefore, the resultant force A'+B' applied to the table portion 4 is in the vertical direction, so that the table portion 4 is moved in the vertical direction.

Figure 13:
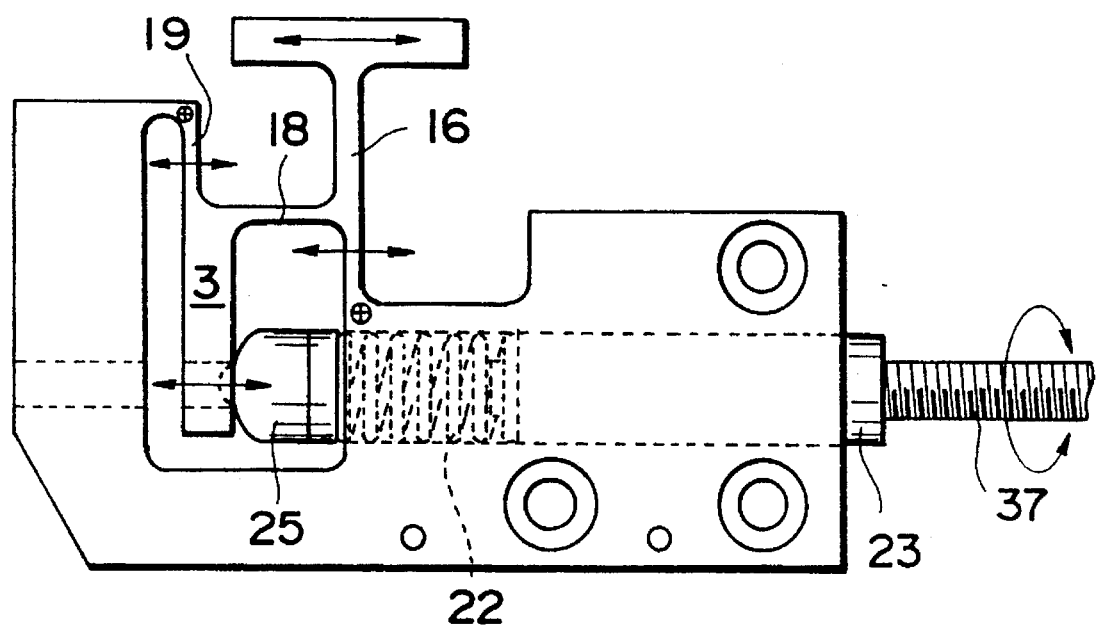
FIG. 13 is a diagram for explaining the operation of the second deformable member.

Referring to FIG. 13, the vertical flexible portion 19 is flexed to the right. At this time, the horizontal flexible portion 18 is flexed downward, and the vertical flexible portion 16 is flexed to the left. Accordingly, the table portion 4 is moved in the horizontal direction.

Assembly

The optical fiber aligning apparatus utilizing driving members for vertical and horizontal driving is assembled in the following manner.

As shown in FIG. 1, a vertical movement driving member V and a horizontal movement driving member H are disposed on the two sides of a base body 21 such that their table portions 4 oppose each other, and bolts are threadably engaged in the bolt holes 7 formed in the respective base portions 1, thereby mounting the vertical movement driving member V and the horizontal movement driving member H to the base body 21. The spring 22 and the cylindrical member 23 are inserted in the insertion hole 5 of each base portion 1, and the guide pin 24 is fitted in each elongated hole 6 and fixed to the end portion of the corresponding cylindrical member 23 serving as a microcylinder. At this time, the shallow cap-like seat member 25 is fitted in the round hole 12 of each urged portion 3, and a cylindrical washer 26 having a flange is fitted on the end portion of the spring 22 projecting from the insertion hole 5 of each base portion 1 toward the urged portion 3. An annular segment 27 is interposed between the seat member 25 and the washer 26, so that the urging force of each cylindrical member 23 can be transmitted to the corresponding urged portion 3.

A block holding member 28 is mounted to each table portion 4, and a block 29 is fixed to the block holding member 28. Each block holding member 28 is a plate-like body in which bolt holes 30 are formed so that it can be mounted on the corresponding table portion 4. Screw hole table portions 31 are provided upright on one end of each block holding member 28 to oppose each other. Each block 29 has a V-groove in its upper surface to receive an optical fiber therein, and is fitted between the screw hole table portions 31. To fix each block 29, the block 29 is fitted on the corresponding block holding member 28. Press plates 32 are arranged on the block 29 to cover the two sides of the block 29. The press plates 32 are fixed on the screw hole table portions 31 through the block 29 with machine screws 33 extending through the press plates 32, thereby fixing the block 29. A clamping segment 34 is arranged at a lower side surface of each base portion 1, a spacer 35 is placed on each clamping segment 34, and screws are inserted to extend through the clamping segment 34 and the spacer 35, thereby fixing the clamping segment 34 and the spacer 35 to the base portion 1.

Figure 4:
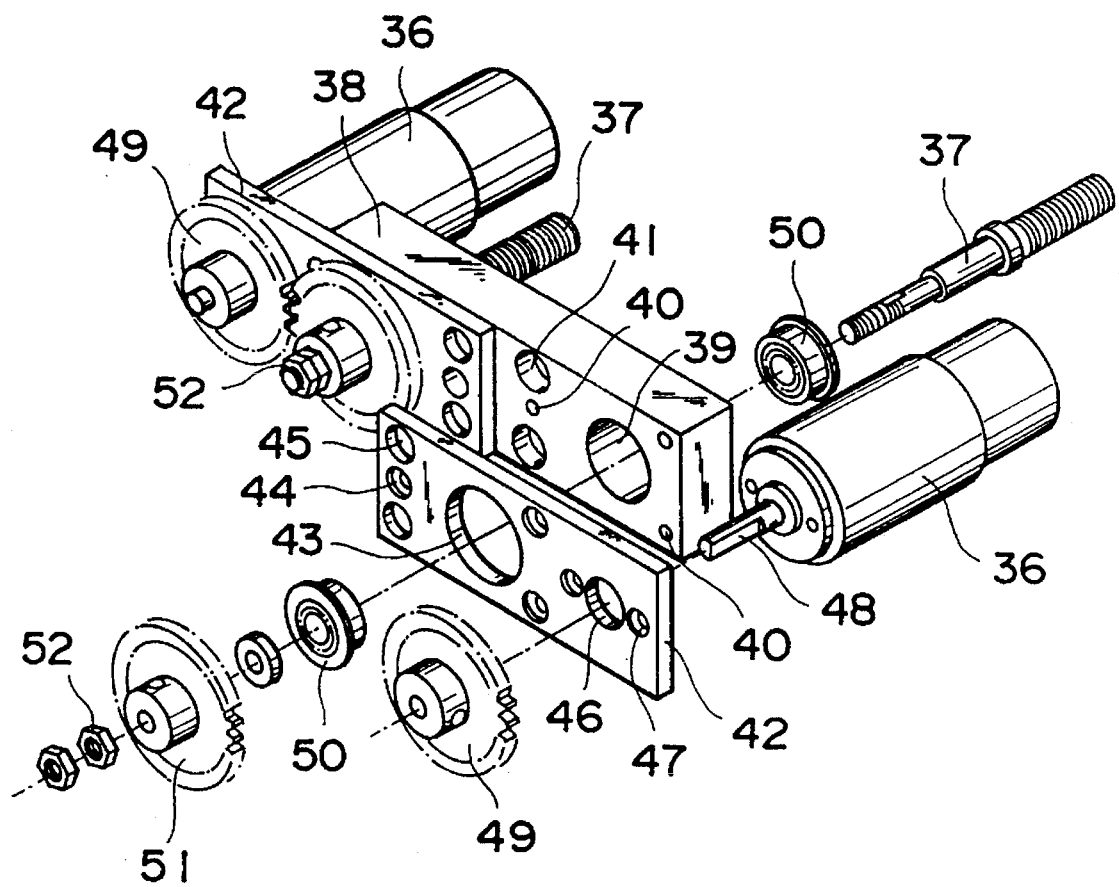
FIG. 4 shows part of the driving mechanism.
Figure 5:
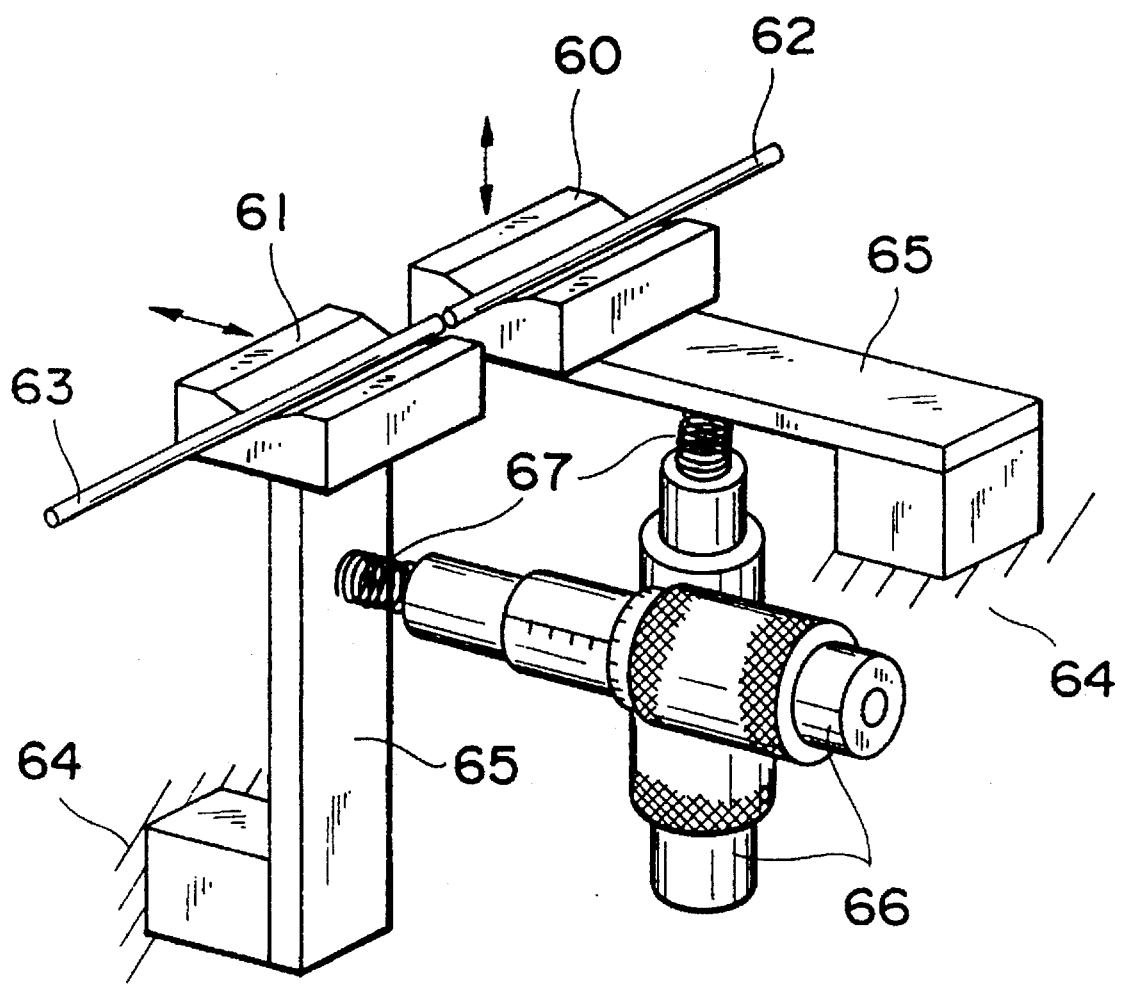
FIG. 5 shows a driving mechanism.

To drive this apparatus, the rotating shafts 37 are driven by using the motors 36 shown in FIG. 4 to threadably engage with the corresponding cylindrical members 23, thereby moving the cylindrical members 23 forward and backward.

In a thin rectangular parallelepiped bearing table 38, two shaft holes 39 are formed in its two sides, four machine screw holes 40 are formed in its four corners, four mounting holes 40 for fixing the bearing table 38 to the base body 21 are formed in its intermediate portion, and two more machine screw holes 40 are formed between the mounting holes 41.

Each of two retaining plates 42 to be mounted to this bearing table 38 has holes 43, 44, and 45 corresponding to the holes 39, 40, and 41 of the bearing table 38. A motor shaft hole 46, and screw holes 47 for fixing the motor 36 to the retaining plate 42 are formed in one side of each retaining plate 42.

Each rotating shaft 37 has one side formed thin and the other side formed thick. Thread ridges are formed on the two end portions of the rotating shaft 37.

The two retaining plates 42 are arranged symmetrically on the front surface of the bearing table 38, and machine screws are inserted in the corresponding machine screw holes 40, thereby fixing the retaining plates 42 to the bearing table 38. At this time, portions of the respective retaining plates 42 where the motor shaft holes 46 and the screw holes 47 are formed project to the two sides of the bearing table 38. Driving shafts 48 of the motors are inserted in the respective shaft holes 46 from the rear surface side of the bearing table 38, and screws are inserted in the screw holes 47, thereby fixing the motors 36 to the corresponding retaining plates 42. Driving gears 49 are mounted to the respective motor shafts 48.

The rotating shafts 37 are inserted in the shaft holes 39 of the bearing table 38 from the rear surface side of the bearing table 38, and bearings 50 are fitted in each shaft hole 39 from the two surfaces of the bearing table 38, thereby mounting the rotating shafts 37 to the bearing table 38 such that the thin sides of the rotating shafts 37 project to the front surface of the bearing table 38. Driven gears 51 are fitted on the respective projecting rotating shafts 37, meshed with the corresponding driving gears 49, and fixed with nuts 52.

Figure 6:
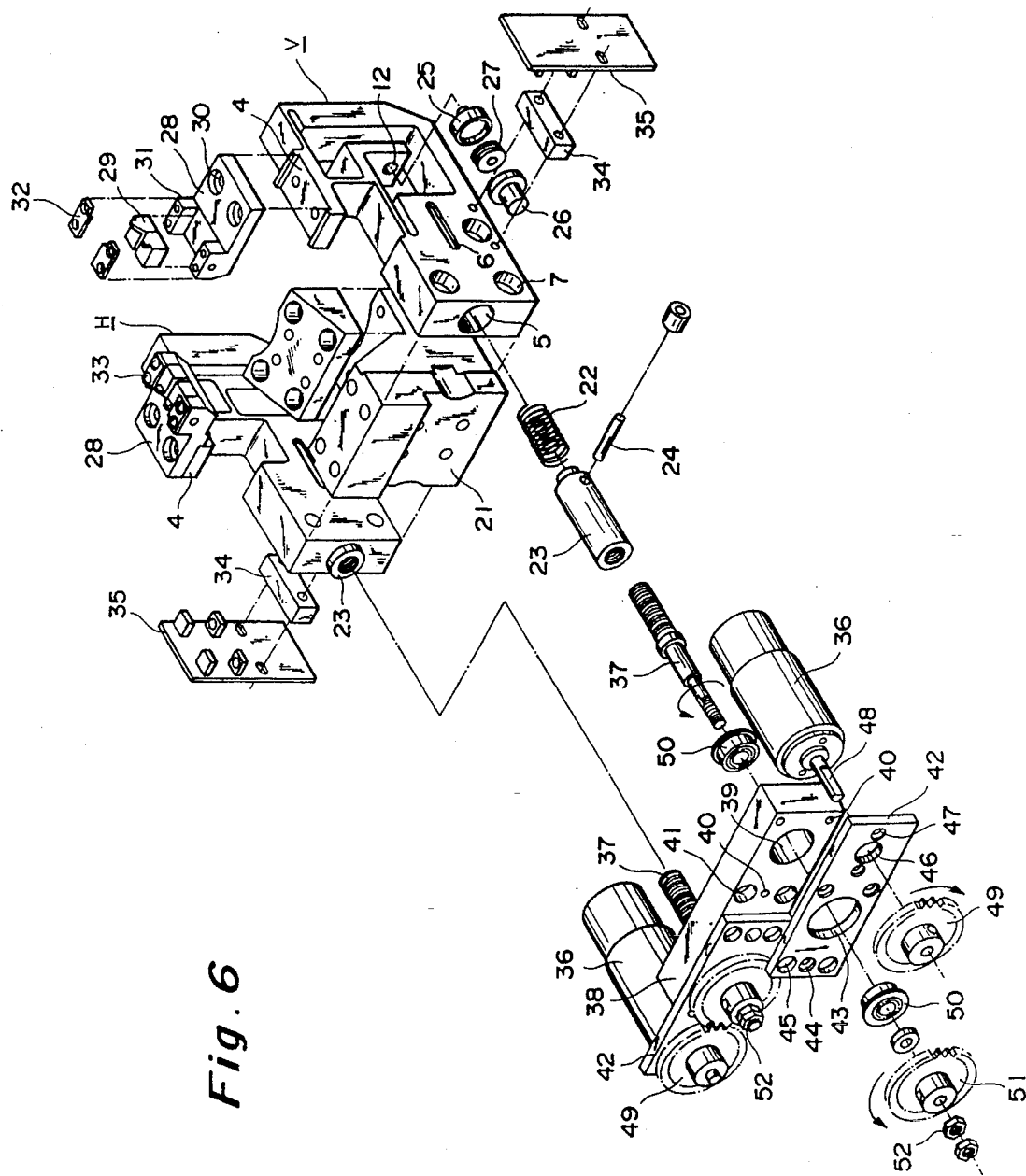
FIG. 6 is a view showing assembly of the driving mechanism shown in FIG. 7.
Figure 7:
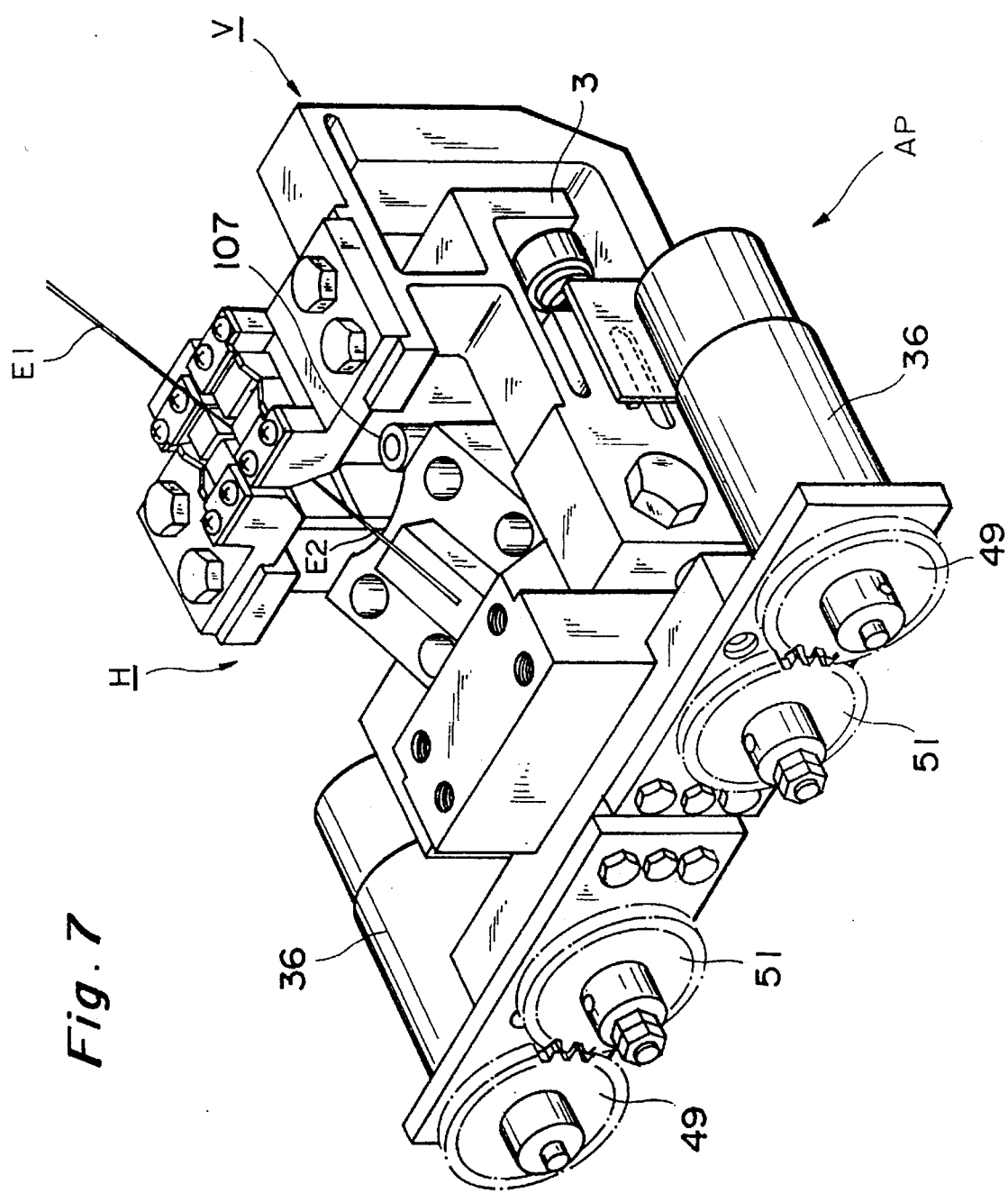
FIG. 7 shows a driving mechanism.

As shown in FIG. 6, the thick sides of the rotating shafts 37 projecting to the rear surface side of the bearing table 38 are threadably engaged with the corresponding cylindrical members 23 shown in FIG. 13, and bolts are inserted to extend through the mounting holes 45 in the retaining plates 42 and the mounting holes 41 in the bearing table 38, thereby mounting these two driving sources to the base body 21. FIG. 7 shows a driving mechanism AP assembled in this manner. In the apparatus having this arrangement, optical fibers are disposed in the V-grooves of the respective blocks 29. The motors 36 are driven to rotate the driving gears 49, and the rotating shafts 37 are rotated in synchronism with the driving gears 49. Although the cylindrical members 23 are threadably engaged with the rotating shafts 37, as the guide pins 24 are engaged in the respective elongated holes 6, they do not rotate themselves, but are moved forward/backward in the insertion holes 5. Thus, the urging force acting on each urged portion 3 can be changed, and each table portion 4 can be moved vertically or horizontally as described above, thereby aligning the optical fibers.

Figure 8:
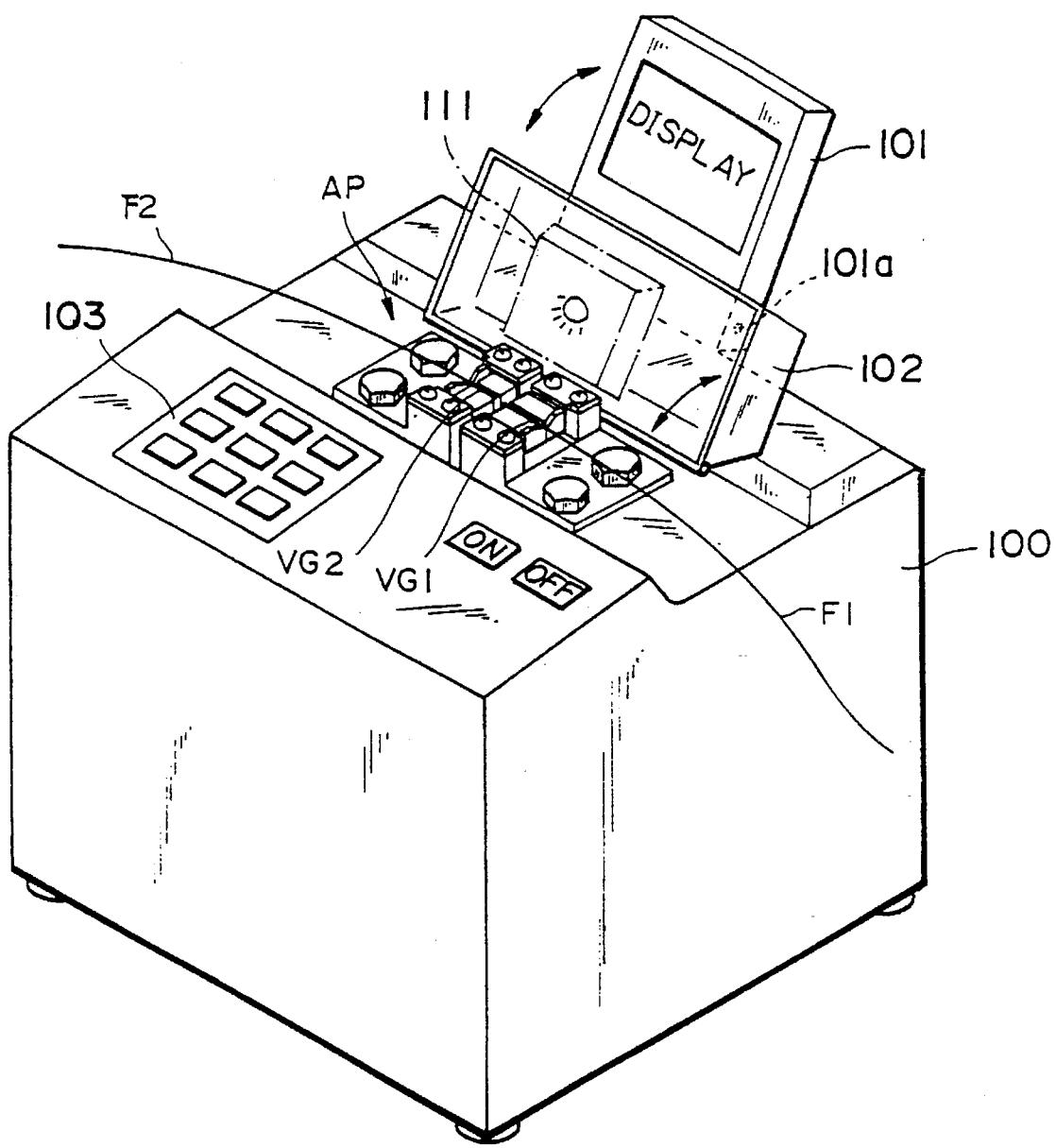
FIG. 8 shows a splicer having the driving mechanism shown in FIG. 7.

FIG. 8 is a view showing the outer appearance of the splicer. The driving mechanism AP shown in FIG. 7 is accommodated in a housing 100. Fibers F1 and F2 are disposed in V-grooves VG1 and VG2 of the respective setting tables or blocks 29. After the fibers F1 and F2 are set, a cover 102 is placed on the fibers F1 and F2, and a high voltage is applied across discharge electrodes E1 and E2. Then, electric discharge occurs between the discharge electrodes E1 and E2, and the end portion of the fiber F1 and that of the fiber F2 are fused with each other. The fibers F1 and F2 are pressed against the setting tables 29 by an LED holder 111. An LED or light source 105 is held by the LED holder 111. An operation for splicing the fibers is performed by using a control panel 103 provided on the upper surface of the housing 100.

Figure 9:
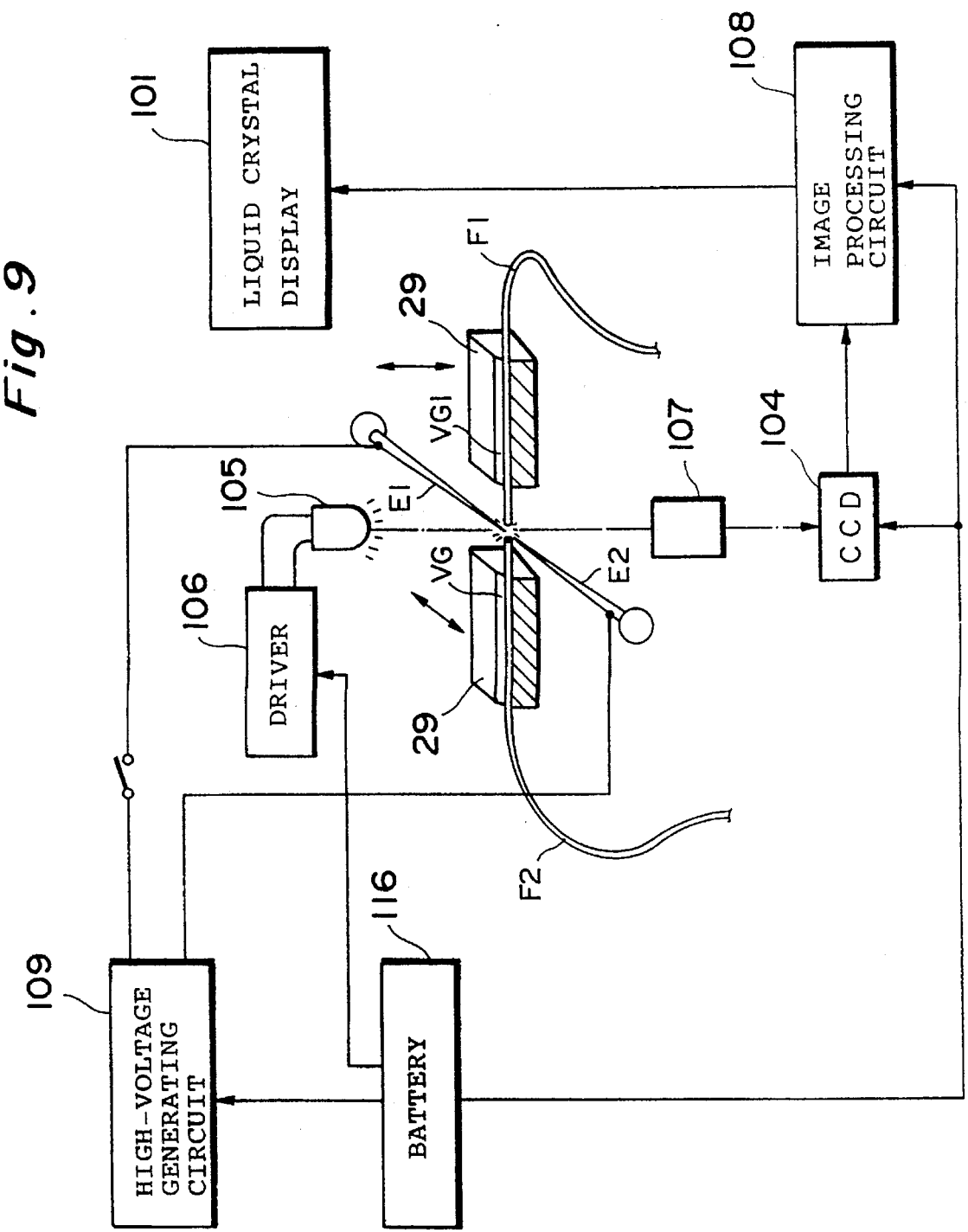
FIG. 9 is a diagram for explaining the structure of the splicer.

As shown in FIG. 9, a CCD image pickup element 104 is provided in the housing 100. When the light source 105, e.g., an LED, is driven by a driver 106, the images of the optical fibers F1 and F2 are projected on the light-receiving surface of the CCD image pickup element 104. The CCD image pickup element 104 is electrically connected to an image processing circuit 108. The image processing circuit 108 transfers a video signal output from the CCD image pickup element 104 to a liquid crystal display 101. Thus, the liquid crystal display 101 displays the images of the optical fibers F1 and F2 with the end faces opposing each other. The liquid crystal display 101 is mounted to the upper portion of the housing 100, and can rotate about a shaft 101a as the center. A high-voltage generating circuit 109 for applying a high voltage across the discharge electrodes E1 and E2 is provided in the housing 100. Power is supplied from a cell 110 provided in the housing 100 to the CCD image pickup element 104, the driver 106; the image processing circuit 108, and the high-voltage generating circuit 109.

In this manner, in each micro-driving member of the present invention, the base portion 1, the support portion 2, the urged portion 3, and the table portion 4 are integrally formed as a single member without a coupling portion at all. Thus, a decrease in precision accompanying backlash among the components, which conventionally poses a problem, and a cumbersome adjusting operation can be avoided.

The above embodiment exemplifies an optical fiber aligning mechanism. However, the present invention can also be applied to various other applications that perform very small movement with high precision.

As has been described above, when the micro-driving member of the present invention is employed, a driving target can be moved by a single member at high precision. Hence, the number of components can be decreased, so that a micro-driving mechanism having a simpler structure can be manufactured. In particular, a decrease in precision accompanying backlash among the components, which conventionally poses a problem since a plurality of components are used, can be solved, and adjustment of the mechanism can be performed easily. Therefore, the micro-driving members of the present invention may be effectively utilized in the optical fiber aligning mechanism and the like.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.218219/1994 filed on Aug. 18, 1994 is hereby incorporated by reference.

What is claimed is:

1. An optical fiber splicer for splicing first and second fibers with each other, comprising:

(A) a first setting table on which the first fiber is placed;

(B) a first deformable member having:

(a) a first table portion for supporting said first setting table, and (b) a first urged portion continuous to said first table portion, wherein said first deformable member is deformable, upon biasing said first urged portion in a horizontal direction, so that said first table portion is moved in a vertical direction;

(C) a second setting table on which the second fiber is placed; and (D) a second deformable member, opposing said first deformable member, and having:

(a) a second table portion for supporting said second setting table, and (b) a second urged portion continuous to said second table portion, wherein said second deformable member is deformable, upon biasing said second urged portion in the horizontal direction, so that said second table portion is moved in the horizontal direction, and further comprising:

a housing for accommodating said first and second deformable members, a CCD image pickup element, arranged in said housing, for picking up images of the first and second fibers, and a display, electrically connected to said CCD image pickup element, for displaying images of the first and second fibers.

2. A splicer according to claim 1, wherein said first and second deformable members are made of stainless steel.

3. A splicer according to claim 1, wherein said first base portion has a guide hole extending in the axial direction of the first through hole, and said splicer comprises a pin fixed to said first cylindrical member and extending through the guide hole.

4. A splicer according to claim 1, further comprising a pair of discharge electrodes provided in a vicinity of a space between said first and second setting tables, so that, when a high voltage is applied across said discharge electrodes, the first and second fibers arranged on said first and second setting tables are fused by heat generated by electric discharge occurring between said discharge electrodes, and are spliced to each other.

5. An optical fiber splicer for splicing first and second fibers with each other, comprising:

(A) a first setting table on which the first fiber is placed;

(B) a first deformable member having:
 (a) a first table portion for supporting said first setting table, and
 (b) a first urged portion continuous to said first table portion,
 wherein said first deformable member is deformable, upon biasing said first urged portion in a horizontal direction, so that said first table portion is moved in a vertical direction;

(C) a second setting table on which the second fiber is placed; and (D) a second deformable member, opposing said first deformable member, and having:
 (a) a second table portion for supporting said second setting table, and
 (b) a second urged portion continuous to said second table portion,
 wherein said second deformable member is deformable, upon biasing said second urged portion in the horizontal direction, so that said second table portion is moved in the horizontal direction, wherein said first deformable member comprises:

a) a first base portion opposing said first urged portion and having a first through hole extending in the horizontal direction;

b) a first support portion continuous to said first base portion such that said first urged portion is arranged between said first base portion and said first support portion;

c) a first horizontal flexible portion, continuous to said first support portion and said first table portion, extending in the horizontal direction, and flexible in a direction of thickness thereof.

d) a second horizontal flexible portion, continuous to said first urged portion and said first base portion, extending in the horizontal direction, and flexible in a direction of thickness thereof; and e) a vertical flexible portion, extending in the vertical direction from a portion near a connecting point of said second horizontal flexible portion and said first urged portion, continuous to said first urged portion and said first table portion, and flexible in a direction of thickness thereof.

6. An optical fiber splicer for splicing first and second fibers with each other, comprising:

(A) a first setting table on which the first fiber is placed;

(B) a first deformable member having:
 (a) a first table portion for supporting said first setting table, and
 (b) a first urged portion continuous to said first table portion,
 wherein said first deformable member is deformable, upon biasing said first urged portion in a horizontal direction, so that said first table portion is moved in a vertical direction;

(C) a second setting table on which the second fiber is placed; and (D) a second deformable member, opposing said first deformable member, and having:
 (a) a second table portion for supporting said second setting table, and
 (b) a second urged portion continuous to said second table portion,
 wherein said second deformable member is deformable, upon biasing said second urged portion in the horizontal direction, so that said second table portion is moved in the horizontal direction, wherein said first deformable member comprises a first base portion opposing said first urged portion and having a first through hole extending in the horizontal direction, and said splicer comprises:

a) a cylindrical member, inserted in the first through hole, having a first threaded inner surface, and slidable in an axial direction of the first through hole;

b) a contact member, arranged between one end of said cylindrical member and said first urged portion, and abutted against said first urged portion;

c) a first spring interposed between said contact member and said cylindrical member;

d) a rod having a first end portion screwed and a second end portion, said first end portion capable of being fitted in said first threaded inner surface of said cylindrical member;

e) a first gear fixed to said second end portion of said rod;

f) a second gear meshing with said first gear; and g) a first motor for rotating said second gear.

7. An optical fiber splicer for splicing first and second fibers with each other, comprising:

(A) a first setting table on which the first fiber is placed;

(B) a first deformable member having:
 (a) a first table portion for supporting said first setting table, and
 (b) a first urged portion continuous to said first table portion,
 wherein said first deformable member is deformable upon biasing said first urged portion in a horizontal direction, so that said first table portion is moved in a vertical direction;

(C) a second setting table on which the second fiber is placed; and (D) a second deformable member, opposing said first deformable member, and having:
  (a) a second table portion for supporting said second setting table, and
  (b) a second urged portion continuous to said second table portion, p2 wherein said second deformable member is deformable, upon biasing said second urged portion in the horizontal direction, so that said second table portion is moved in the horizontal direction, wherein said second deformable member comprises:

a) a second base portion opposing said second urged portion and having a second through hole extending in the horizontal direction;

b) a second support portion continuous to said second base portion such that said second urged portion is arranged between said second base portion and said second support portion;

c) a first vertical flexible portion, continuous to said second table portion and said second base portion, extending in the vertical direction, and flexible in a direction of thickness thereof;

d) a horizontal flexible portion, continuous to said second urged portion and said first vertical flexible portion, extending in the horizontal direction, and flexible in a direction of thickness thereof; and e) a second vertical flexible portion, extending in the vertical direction from a portion near a connecting point of said horizontal flexible portion and said second urged portion, continuous to said second urged portion and said second support portion, and flexible in a direction of thickness thereof.

\* \* \* \* \*